United States Patent
Takeda et al.

(10) Patent No.: US 6,577,969 B2
(45) Date of Patent: Jun. 10, 2003

(54) FOOD SAFETY ADMINISTRATION SYSTEM

(75) Inventors: Kazumi Takeda, Tokyo (JP); Kenji Murakami, Tokyo (JP); Atsushi Kusano, Tokyo (JP)

(73) Assignees: Yokogawa Electric Corporation, Tokyo (JP); Yokogawa M & C Corporation, Tokyo (JP); McDonald's Company (Japan), Ltd., Tokyo (JP)

(*) Notice: Subject to any disclaimer, the term of this patent is extended or adjusted under 35 U.S.C. 154(b) by 56 days.

(21) Appl. No.: 09/800,302

(22) Filed: Mar. 3, 2001

(65) Prior Publication Data

US 2002/0035439 A1 Mar. 21, 2002

(30) Foreign Application Priority Data

Sep. 19, 2000 (JP) .......................................... 2000-283142

(51) Int. Cl.[7] .............................................. G01N 37/00
(52) U.S. Cl. ............................................ 702/81; 702/83
(58) Field of Search ............................ 99/326, 321, 337, 99/329 R; 702/81, 127, 130, 122, 128, 134, 182, 183, 83; 426/231

(56) References Cited

U.S. PATENT DOCUMENTS

| | | | |
|---|---|---|---|
| 4,516,125 A | * | 5/1985 | Schwab et al. ............... 343/7.7 |
| 4,742,227 A | * | 5/1988 | Takenaka ................... 250/336.1 |
| 5,321,629 A | * | 6/1994 | Shirata et al. .......... 364/551.01 |
| 5,900,801 A | | 5/1999 | Heagle |
| 5,939,974 A | | 8/1999 | Heagle |
| 5,951,900 A | | 9/1999 | Smrke |
| 5,956,658 A | * | 9/1999 | McMahon .................... 702/83 |
| 6,085,576 A | * | 7/2000 | Sunshine et al. ........... 73/29.01 |
| 6,276,264 B1 | * | 8/2001 | Dumm ......................... 99/455 |

FOREIGN PATENT DOCUMENTS

JP 2001-033316 * 2/2001 ............ G01K/7/02

OTHER PUBLICATIONS

Kseibat, D; Basir, O.A.; Mittal, G. S.; "An Artificial Neural Network for Optimizing Safety and Quality in Thermal Food Processing"; Proceedings of the IEEE international symposium on Intelligent Control/Intellingent Systems and Semiotics; 1999; pp 393–398.*

Gwo–Jia, J; Te–Jen, S; Cheng–Hong, Y; Moir, T J; "Remote Wireless Measuring Systems"; 6th International Conference on Emerging Technologies and Factory Automation Proceedings; 1997; pp 55–59.*

Ockerman, J J; Najjar, L J; Thompson, J C; "Wearable Computers For Performance Support: Initial Feasibility Study"; First International Symposium of Wearable Computers Digest of Papers; 1997; pp 10–17.*

Najjar, L J; Thompson, J C; Ockerman, J J; "A Wearable Computer For Quality Assurance Inspectors In A Food Processing Plant"; First International Symposium of Wearable Computers Digest of Papers; 1997; pp 163–164.*

Kseibat D "An artificial neural network for optimizing safety and quality in thermal food processing" Proceedings fo the 1999 IEEE international . . . etc . .

(List continued on next page.)

Primary Examiner—John Barlow
Assistant Examiner—Douglas N Washburn
(74) Attorney, Agent, or Firm—Moonray Kojima

(57) ABSTRACT

A food safety administration system for controlling safety of of food handling locations, wherein a mobile inspection terminal measures the temperature of an object under test or receives data on the pass or failure status of the object; a device records the temperature data and the pass or failure data, according to check items on a checklist; and a device controls the safety of the location and of the food therein using the temperature data and pass or failure data provided as test data by the mobile inspection terminal, whereby data is reliably and quickly checked without use of paper based data.

23 Claims, 6 Drawing Sheets

OTHER PUBLICATIONS

Proceedings of 14th Int. Symposium on Intell. Control, Cambridge MA, Sep. 15–17 1999, p. 393–398, 1999 IEEE USA.

McAnelly JK "HACCP, a totla qulaity system for assugin fooed safety and qualtiy" Annual Reliabiltiy and maintainability symposium, Anaheim CA, Jan. 24–27 1994, IEEE.

* cited by examiner

FIG.3

| a | b | c | d | e | f | g | h |
|---|---|---|---|---|---|---|---|
| CHECK ITEM | VERIFICATION | RECORDING METHOD | LOWER TEMPERATURE LIMIT | LOWER-LIMIT ALARM | UPPER TEMPERATURE LIMIT | UPPER-LIMIT ALARM | ALARM INVERSION |
| ... | ... | ... | ... | ... | ... | ... | ... |
| EGG YOLK | ON | OK/NG | | | | | |
| EGG TEMPERATURE | ON | TEMPERATURE ONCE | 74.0 | ON | | | ON |
| EGG SOLUTION | OFF | TEMPERATURE ONCE | 74.0 | ON | | | ON |
| BF SAUSAGE | ON | TEMPERATURE 8TIMES-AVERAGE | 72.0 | ON | 75.0 | ON | ON |
| ... | ... | ... | ... | ... | ... | ... | ... |

FIG.6

| | DATE | 03/13/00 MONDAY | 03/14/00 TUESDAY | ... |
|---|---|---|---|---|
| | CHECKER | AKAI | ISHIKAWA | ... |
| | REFERENCE TEMPERATURE | | | ... |
| ... | ... | ... | ... | |
| BREAK THE COOKED EGG. IS THE YOLK RUNNY ? | | OK | OK | ... |
| DOES THE INTERNAL TEMPERATURE OF THE COOKED EGG MEET THE CRITERION? | MORE THAN 74°C | 73.9 | 74.3 | ... |
| IF NOT, TAKE CORRECTIVE ACTION AND MEASURE THE TEMPERATURE AGAIN. | MORE THAN 74°C | 74.1 | | ... |
| COOKING-BF SAUSAGE PATTY | | | | |
| ON ALL GRILL PLATES USED, DOES THE AVERAGE OF TEMPERATURES TAKEN OF PATTIES LOCATED AT THE FOUR CORNERS OF EACH PLATE MEET THE REFERENCE VALUE ? | 72°C~75°C | 72.4 | 72.4 | |
| ... | ... | ... | ... | |

A

FOOD SAFETY ADMINISTRATION SYSTEM

BACKGROUND OF THE INVENTION

1. Field of Invention

This invention relates to a food safety administration system for controlling the hygiene or safety of food processing locations; and, mote particularly, to improvements therein which result in increased efficiency and elimination of paper based checklists.

2. Description of the Prior Art

Every food processing location, such as food shops, food factories, and the like, use a HACCP system and is required to maintain and control records of test data. For example, conventionally, a food shop or the like has a human operator or checker check daily a number of various data, such as temperature, pass or failure data, etc, for hygenic control of food items, such as hamburgers. Then, the shop personnel fills in the results of the checking of various items onto a paper based check list. This practice might not be overwhelming or time consuming if only a single shop is involved. However, when a multitude of shops are involved in checking data every day, an enormous amount of paper work and human labor are consumed. Thus, the practice is an important issue involving economics and environmental concerns. The amount of paper which is involved can overwhelm the waste collection activity. Moreover, paper based recording of data involves use of a large amount of foreign matter into the work area. Accordingly, conventional data collection involves the added risk of introducing foreign matter into food preparation and cause other problems, from a hygenic standpoint.

Another disadvantage of the conventional system is that the human checker or operator must carry paper based checklists, writing apparatus, and thermometers in checking various data at various locations within the shop. Thus, at each location, the human checker must put down his instruments and thermometer,etc, take the readings, and then write down the data. Then, the human checker must repeat the procedure at the next location. As can be seen, the constant picking up, putting down, writing,etc, require an enormous amount of time. Thus, the conventional system is inefficient, time consuming, expensive and since it is based on human data taking and recording, subject to error.

SUMMARY OF THE INVENTION

Accordingly, an object of the invention is to overcome the aforementioned and other deficiencies, disadvantages, and problems of the prior art.

Another object is to provide a food safety administration system wherein data is checked with high speed, high efficiency, and reliability, without requirement of paper based documents.

The foregoing and other objects are attained by the invention which encompasses a food safety administration system comprising a mobile inspection terminal for measuring temperature of an object and for receiving data on pass or fail of the object according to check items on a checklist, means for recording the temperature data and pass or fail data, and means for controlling the safety of the shop, factor or other food processing location using the temperature data and pass or fail data provided by the mobile inspection terminal.

BRIEF DESCRIPTION OF THE DRAWINGS

FIG. 3 is a chart depicting the checklist of FIG. 1.

FIG. 6 is a chart depicting an example of a data sheet of FIG. 1.

DETAILED DESCRIPTION OF THE PREFERRED EMBODIMENTS

Figure 1:
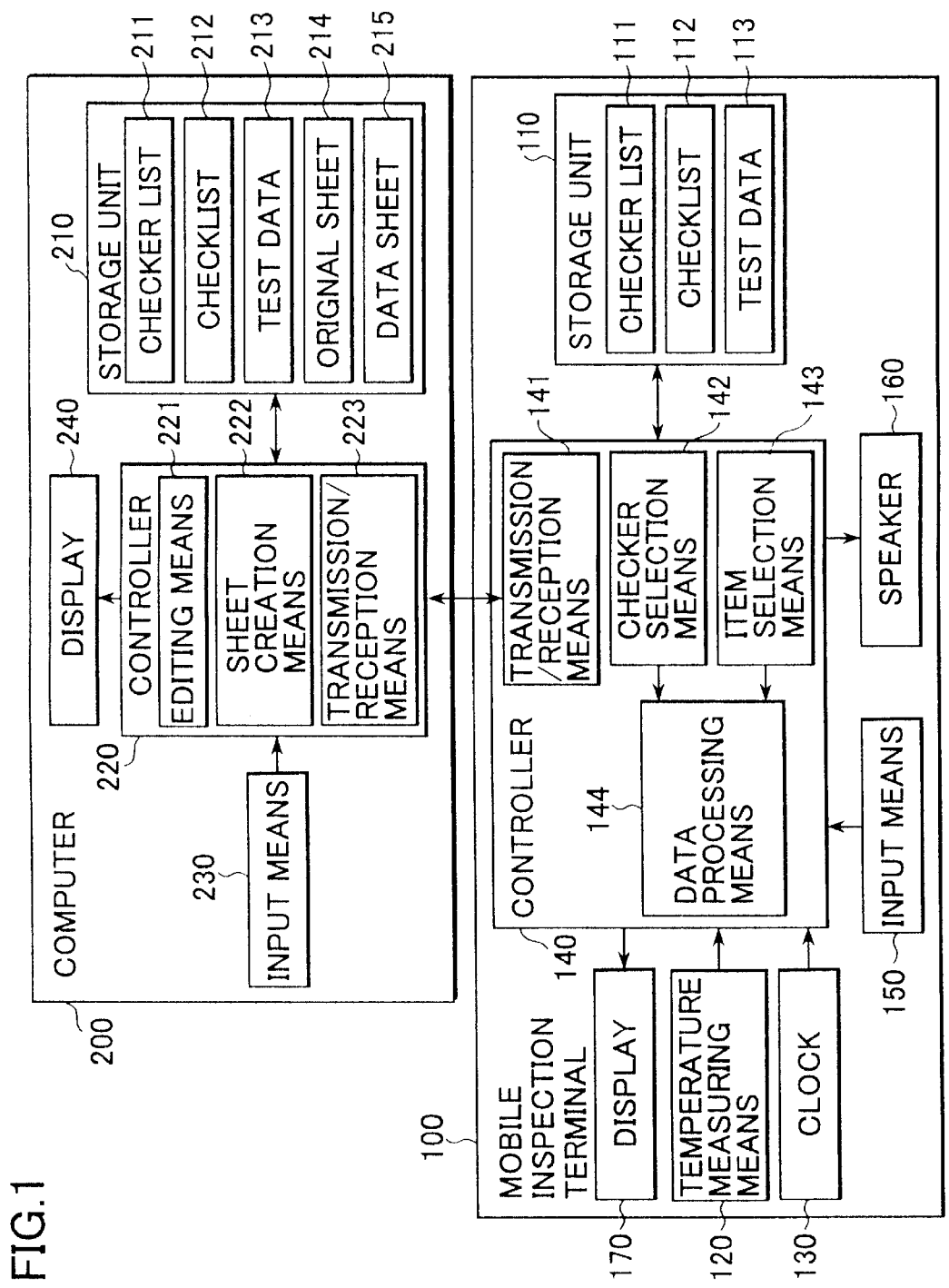
FIG. 1 is a block diagram depicting an illustrative embodiment of the invention.
Figure 2:
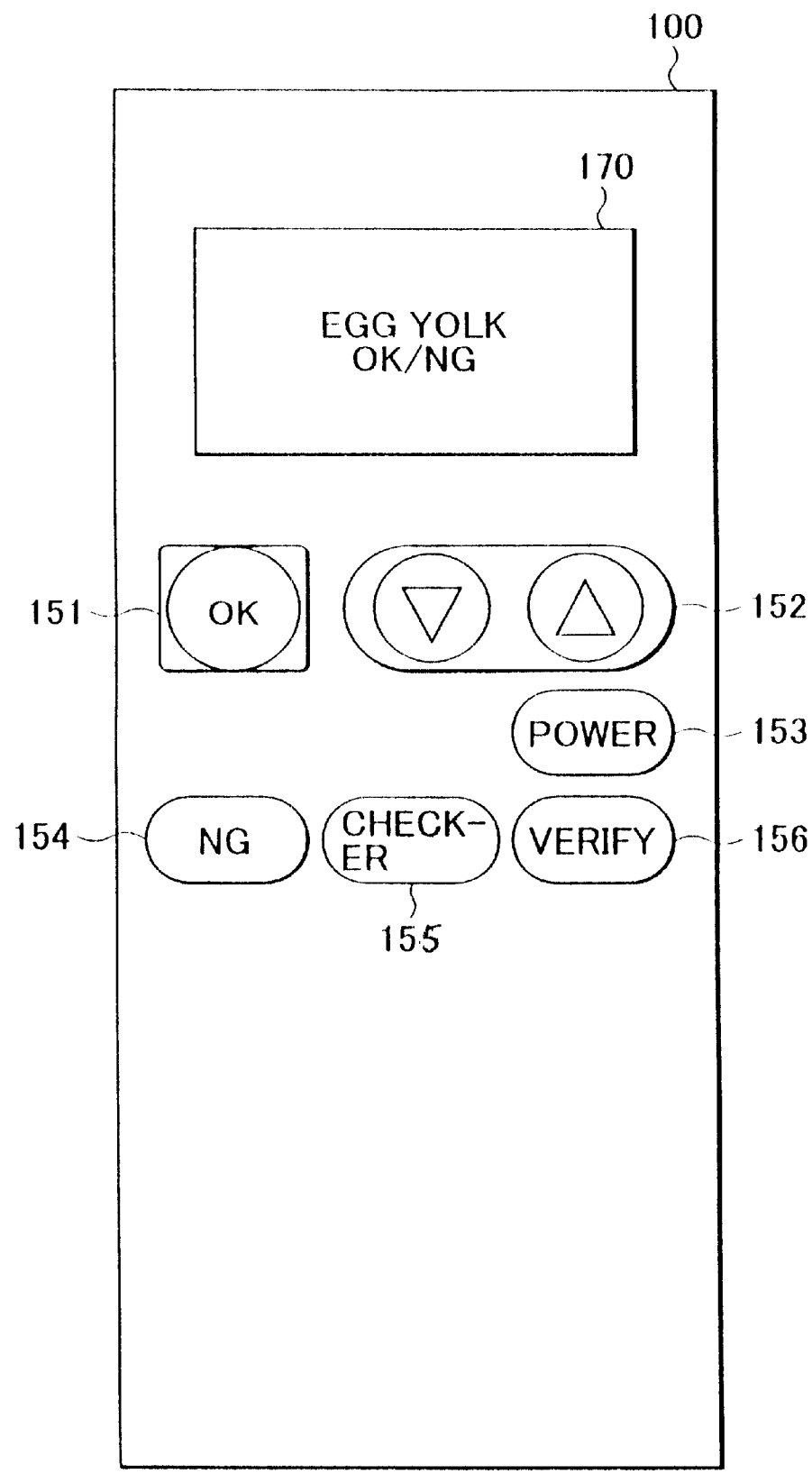
FIG. 2 is a schematic view depicting the face of the mobile inspection terminal of FIG. 1.

FIG. 1 shows an illustrative embodiment of the invention and FIG. 2 shows an external face of the mobile inspection terminal 100 of FIG. 1. A sensor probe, which would otherwise be connected to the top end of terminal 100 is omitted from FIG. 2. In FIG. 1, mobile inspection terminal 100 is of a portable size and is designed to communicate with a computer 200. The method of communication can be wired communication, wireless communication, optical communication, etc. Mobile inspection terminal 100 comprises a storage unit 110, temperature measuring means 120, a clock 130, a controller 140, input means 150, speaker 160, and a display 170(which can be liquid crystal display). Computer 200 comprises a storage unit 210, a controller 220, input means 230, and a display 240.

Storage unit 110, is for example, a memory device, and stores a checker list 111, a checklist 112, and test data 113. Checker list 111 is a list of checker data items. Checklist 112 is a list of check items to be checked. Test data 113 is the result of checking the check items. Temperature measuring means 120 measures the temperature of an object under test, such as food or a refrigerator. Clock 130 outputs data and/or time data. Controller 140 is connected to storage unit 110, temperature measuring means 120, clock 130, input means 150, speaker 160 and display 170.

Controller 140 comprises transmission/reception means 141, checker selection means 142, item selection means 143 and data processing means 144. Transmission/reception means 141 exchanges data with computer 200 and writes data into storage unit 110 or reads data therefrom. Checker selection means 142 selects from checker data items on checker list 111 in storage unit 110 to cause the data items to be shown on display 170. Item selection means 143 selects from check items on checklist 112 in storage unit 110 to cause the check item to be shown on display 170. Data processing means 144 accepts the input of checker data from checker selection means 142, input of a check item from item selection means 143, input of temperature data from temperature measuring means 120, and input of data and/or time data from clock 130. The data processing means 144 then processes data according to the check item, causes the result of the data processing to be shown on display 170, provides sounds to the speaker 160, and stores the result of checking of the check items in storage unit 110 as an item of test data 113, and furthermore stores the data and/or time data, the check item and checker data.

Input means 150 comprises, for example, button 151 to 156 (see FIG. 2) and orders checker selection means 142 and item selection means 143 to select a checker data item and a check item, respectively. Input means 150 also orders data processing means 144 to acquire temperature data from temperature measuring means 120 or receives as input the pass or fail data (e.g. OK/NG as shown in FIG. 2).

As shown in FIG. 2, button 151 is an OK button; button 152 is a SELECT button; button 153 is a POWER button;

button 154 is an NG button; button 155 is a CHECKER button; and button 156 is a VERIFY button.

Storage unit 210 is, for example, a hard disk and stores checker list 211, checklist 212, test data 213, original sheet 214, and data sheet 215. Checker list 211, checklist 212 and test data 213 can be the same as the checker list 111, check list 112, and test data 113 in the storage unit 110. Original sheet 214 is a sheet used to create data sheet 215. Data sheet 215 is a sheet obtained by recording test data 213 on original sheet 214 and is also a table of the results of checking the check items.

Controller 220 is connected to storage unit 210, input means 230, and display 240, and comprises editing means 221, sheet creating means 222, and transmission/reception means 223. Editing means 221 causes checker list 211 an checklist 212 in storage unit 210 to be shown on display 240 so that the lists may be edited. Sheet creation means 222 creates data sheet 215 from test data 213 and original sheet 214 and causes the data sheet to be shown on display 240. Transmission/reception means 223 exchanges data with mobile inspection terminal 100 and writes data into storage unit 210 and reads data therefrom.

Input means 230 is, for example, a keyboard or a mouse and provides instructions to the editing means 221, sheet creation means 222 and transmission/reception means 223.

Operation of the system of FIG. 1 is as follows, beginning with the preprocessing carried out prior to the checking of data. Editing means 221, as instructed by input means 230, causes checker list 211 and checklist 212 to be shown on display 240, and edits the lists, or creates new lists, and causes the storage thereof in storage unit 210. Checklist 212 is created in the format shown in FIG. 3, wherein column a "Check Item" lists data items to be measured or checked; column b "Verification" identifies whether or not input of the result of checking each item in column a should be verified; column c "Recording Method" shows type of test data 113, i.e. OK/NG, temperature, average temperature, or minimum temperature; Column d "Lower Temperature Limit" denotes the lower limit of temperature measurement criteria; Column e "Lower-Limit Alarm", shows whether any lower limit is set in column d and the corresponding field of column e is set to ON, then an alarm is enabled; Column f "Upper Temperature Limit" denotes the upper limit of temperature measurement criteria; Column g "Upper-Limit Alarm" shows whether any upper limit is set in column f and corresponding field of column g is set to ON, then the alarm is enabled; and Column h "Alarm Inversion" is set to OFF when the alarm is turned ON for temperature outside the upper and lower limits of a given reference temperature, or is set to ON when the alarm is turned ON for temperatures within the upper and lower limits. The conditions set in columns d, e, f, g, and h serve as those of an average temperature or minimum temperature when that type of temperature is set in column c.

Input means 230 instructs transmission/reception means 223 to read checker list 211 and checklist 212 from storage unit 210, and to sent the lists to the mobile inspection terminal 100. Transmission/reception means 141 receives the lists and stores the lists in storage unit 110.

Figure 4:
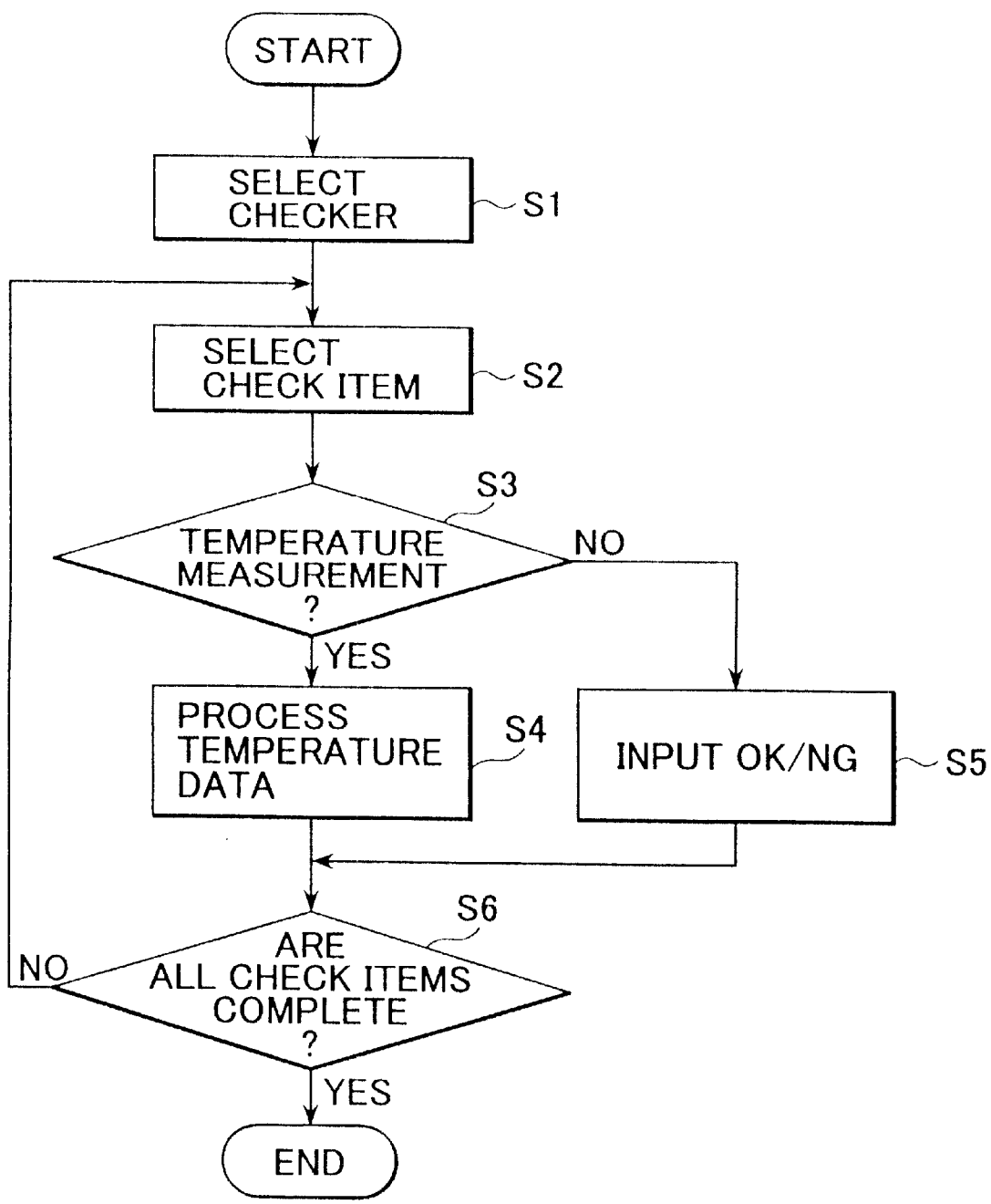
FIG. 4 is a flow chart depicting operation of the mobile inspection terminal of FIG. 1.
Figure 5:
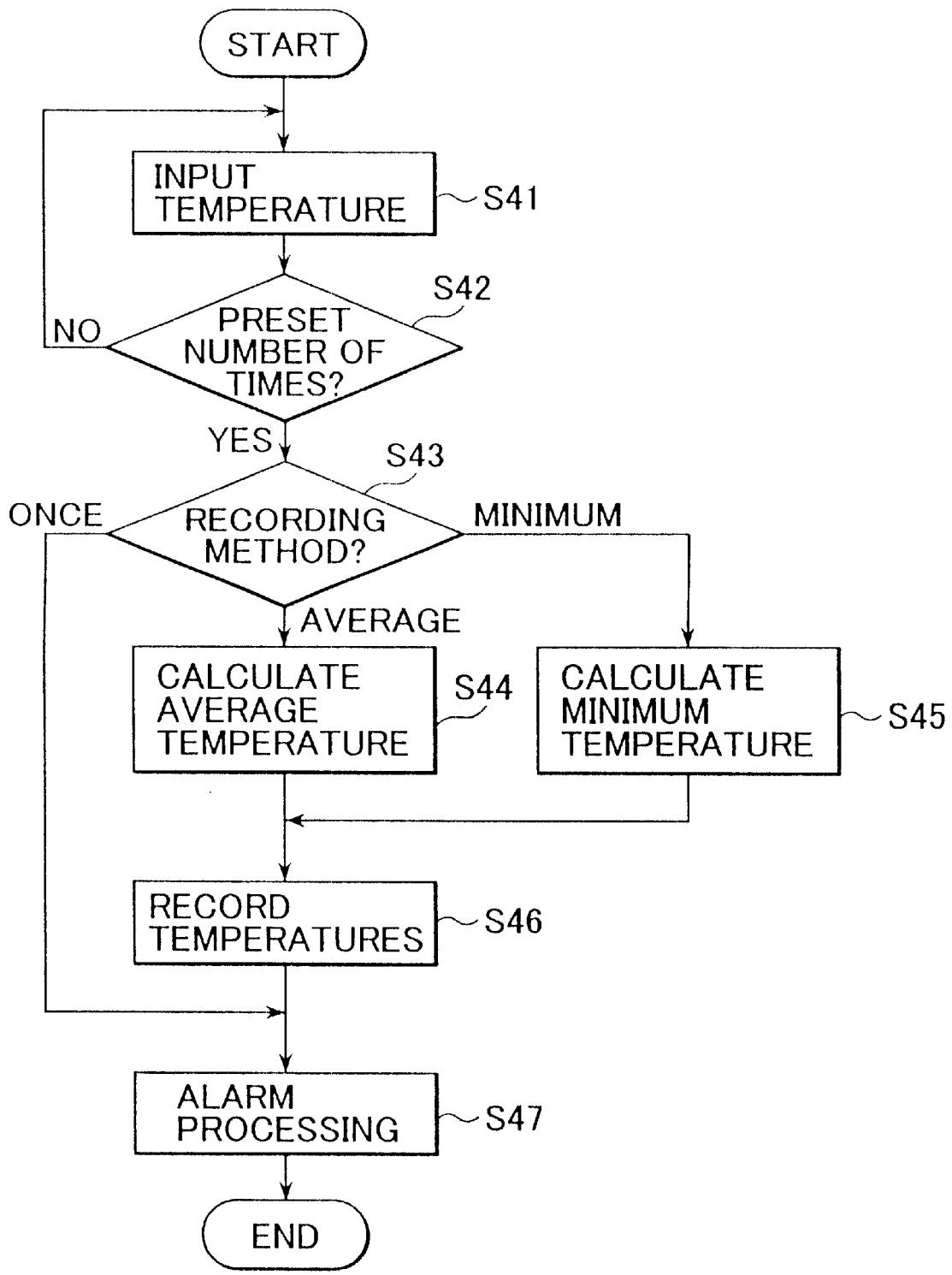
FIG. 5 is a flow chart depicting details on the step of process of temperature of FIG. 4.

The process of checked data is explained with reference to FIG. 4 which is a flow chart showing behavior of terminal 100 and also with reference to FIG. 5 which is another flow chart showing more details of the processing of temperature data, ie step S4 in FIG. 4. For steps S1–S6, see FIG. 4, and for steps S41–S47 see FIG. 5.

Button 153 is pressed to turn ON mobile inspection terminal 100. Then, upon pressing button 155, checker selection means 142 reads checker list 111 from storage unit 110 and causes checker data to be shown on display 170. Upon pressing button 152, checker selection means 142 scrolls through a list of checker data items on display 170. Upon pressing button 151, a checker data item is selected and checker selection means 142 sends the data item to data processing means 144 (Step S1). Upon pressing button 152, item selection means 143 reads checklist 112 from storage unit 110 and causes an item of column a to be shown in the upper section of display 170. When the option for column c is OK/NG, item selection means 141 causes OK/NG to be shown in the lower section of display 170. When the option is temperature, item selection means 143 causes the temperature range defined by column d and column f to be shown in the lower section of display 170. These readings are made to disappear in a few seconds. Then, data processing means 144 acquires time data from clock 130 to cause the time to be shown in the upper section of display 170 and acquires temperature data from temperature measuring means 120 to cause the temperature to be shown in the lower section of display 170. Item selection means 143 also sends check items (i.e. data items selected for column a, column b, column c, column d, column e, column f, column g, and column h) to data processing means 144 (Step S2).

When the option for column c is temperature, temperature data is processed (Step S3 and S4). More specifically, a sensor probe, not shown in FIG. 2, is brought into contact with the object under test. Upon pressing button 151, data processing means 144 receives as an input temperature data from temperature measuring means 120 and input of date and/or time data from clock 130. Then, data processing means 144 stores the data items in storage unit 110 as items of test data 113, and data in column a and checker data.(Step S41)

When no entry is made in the Present Number of Times field of a cell under column c, data processing means 144 also receives as input temperature data from temperature measuring means 120 and date and/or time data from clock 130 upon pressing of button 151 again. Then, data processing means 144 also stores these data items in storage unit 110 as items of test data 113 and data in column a and checker data (Steps S42 and S41). When an entry is made in the Preset Number of Times field, data processing means 144 proceeds to the next process step. (Step S42).

In a further step, data processing means 144 checks column c (Step S43). When the Preset Number of Times field of a cell under column c is set to "once", data processing means 144 proceeds to the next process. When "average temperature" is specified for a cell under column c, data processing means 144 reads as many temperature data items as the preset number of times from test data 113 in storage unit 110, calculates the average temperature, and cause the temperature to be shown on display 170 (Step S44). When "minimum temperature" is specified for the cell under column c, data processing means 144 reads as many temperature data items as the preset number of times from test data 113 in storage unit 110, calculates or selects the minimum temperature, and causes the temperature to be shown on display 170 (Step S45). Upon pressing button 151, data processing means 144 stores the average or minimum temperature shown on the display 170 in storage unit 110 as an item of test data 113 and data in column a and checker data (Step S46).

In a further step, data processing means 144 causes an alarm to be sounded through speaker 160 when the temperature data to be stored in storage unit 110 satisfies the conditions set in column d, column e, column f, column g, and column h of the checklist 112. Hence, the checker can readily known whether or not the result of temperature measurement satisfies a given reference temperature requirement.

In the case where the OK/NG option is selected for a cell under column c, OK is inputted upon pressing button 151 and NG is inputted upon pressing button 154. Data processing means 144 stores the date and/or time data of clock 130, OK/NG data, checker data and data in column a in storage unit 110 as items of test data 113 (Step S5).

When there is a check item or items to be checked, the checker presses button 152 again. Item selection means 143 reads the next check item from checklist 112 in storage unit 110 and causes the item to be shown in display 170, in order to repeat the foregoing process steps (Steps S6 and S2). When the checker is through with all check items, the process of checking data is completed (Step S6).

Upon pressing button 156, item selection means 143 checks the checklist 112 and test data 113 in storage unit 110. Then, item selection means 143 causes the display 170 to show the number of check items for which column b of checklist 112 is set to ON and for which no test data is provided. By pressing button 152, the checker can successively show the check items under column a that lack test data, in order to proceed with the above process of checking data.

Finally, post-processing using computer 200 is discussed with reference to FIG. 1. When an instruction to transmit data is provided by input means 230, transmission/reception means 233 requests transmission/reception means 141 to send data. Then, transmission/reception means 141 reads the test data 113 from storage unit 110 to send the data to transmission/reception means 223. Transmission/reception means 223 stores the received data in storage unit 210 as test data 213.

Input means 230 instructs sheet creation means 222 to create a data sheet, such as data sheet 215 shown in FIG. 6, from test data 213 and original sheet 214 stored in storage unit 210. Sheet creation means 222 then causes the data sheet to be shown on display 240 and causes the storage of the sheet in storage unit 210. More specifically, test data 213 is applied to table cells enclosed by the dotted lines A in FIG. 6, thereby creating data sheet 215. At this point, the checker data item highest on the list is entered into each checker field.

To be more specific, sheet creation means 222 comprises table calculation and processing means, e.g. spreadsheet software by Microsoft Excel, and of a macroprogram for creating data sheet 215 by combining test data 213 and original sheet 214. Accordingly, the macroprogram, test data 213, original sheet 214, and data sheet 215 are integrated into a single data file in most cases when sheet creation means uses table calculation and processing means.

The food safety administration system of the invention has the following and other advantages and effects.

(1) Mobile inspection terminal 100 is used to record temperature data and to receive pass or failure data. Hence, there is no need for recording data on sheets of actual paper. Accordingly, the human checker or operator can readily check data with high efficiency, greater realibility, and greater savings in cost. The operating system is paperless.

(2) By referring to the checklist 112 and test data 113, item selection means 143 of mobile inspection terminal 100 causes selection and display of the check items which lack corresponding test data. Hence, it is possible to prevent erroneous omission of any check item (3) Mobile inspection terminal 100 displays the upper and lower limits of each reference temperature and check items. Hence, there is no need for the human checker to remember the limits. Accordingly, mistakes in checking data are prevented from occurring.

(4) Checker selection means 142 selects checker data from checker list 111. The mobile inspection terminal 100 then handles the checker data as an item of test data 113. Hence, it is possible to readily recognize who is responsible for the given test results.

(5) Mobile inspection terminal 100 handles the date and/or time from clock 130 as an item of test data 113. Hence, it is possible to record the date and/or time of test results.

(6) Test data 113 is transferred from the mobile inspection terminal 100 to computer 200. Sheet creation means 222 then creates data sheet 215 from test data 213 and original sheet 214. Hence, it is easy, with the invention, to summarize the test results.

(7) Checklist 212 is edited using editing means 221 of computer 200 and is sent to mobile inspection terminal 100. Hence, it is easy to reorder and/or increase and/or decrease the check items on the checklist 212 provided as a standard. Accordingly, the human checker can sequentially show check items tailored to a particular food shop or location, irrespective of how the equipment layout or number of equipment differs from shop or location to shop or location, thus increasing work efficiency greatly.

(8) Checker list 211 is edited using editing means 221 of computer 200 and is sent to mobile inspection terminal 100. Hence, it is easy, with the invention, to rapidly change checker data.

The invention is not to be considered to be limited to the foregoing description. Although in one aspect, the pass or failure data is represented as OK/NG, such a representation as YES/NO, OK/NO or GOOD/BAD may be used instead. In fact, any representation is acceptable as long as the pass or failure judgment is made.

In another aspect of the invention, data processing means 144 stores the checker data in storage unit 110 for each temperature or checker data item. Alternatively, the checker data may be stored for a series of check items.

Similarly, data processing means 144 stores check items in the storage unit 110 for each temperature or checker data item. Alternatively, in the system each check item may be stored as an item of test data 113 when selected by the item selection means 143. Moreover, although the data processing means 144 is discussed as not storing check items as items of the test data 113, the data processing means 144 may store each check item in a location within storage unit 110 corresponding to that check item. Thus, the check item may be identified according to the location thereof within the storage unit 110.

In a further aspect of the invention, test data 113 is transferred from mobile inspection terminal 100 to computer 200 so that data sheet 215 is created. Alternatively, the test data 113 may be stored in a database. This system of the invention makes possible food safety administration in a reliable, fast, and paperless manner.

In another aspect of the invention, sheet creation means 222 creates the data sheet 215 from test data and original sheet 214. Alternatively, the sheet creation means 222 may create data sheet 215 from test data 213 only and without using original sheet 214.

A further aspect of the invention encompasses the mobile inspection terminal 100 comprising temperature measuring means 120. Alternatively, the terminal 100 may comprise means for measuring various variables, such as wind speed, humidity, noise, voltage, current, etc, and the date and/or time the data is thus measured, and such other data may be added to the test data.

The invention is applicable to control safety and other factors involved in foods, food preparation, as well as such safety and other factors in and about food locations, such as food shops, cafeterias, kitchens, food factories, restaurants, take out type food stores, fast food restaurants, and wherever food is prepared and/or served, including institutions, hospitals, companies, schools, etc.

The foregoing description is illustrative of the principles of the invention. Numerous extensions and modifications thereof would be apparent to the worker skilled in the art. All such extensions and modifications are to be considered to be within the spirit and scope of the invention.

What is claimed is:

1. A food safety administration system comprising:

mobile inspection terminal means for measuring temperature of an object under test and for receiving data on pass or failure of said object according to check items on a checklist, said mobile inspection terminal means being portable and hand holdable and comprising a flat surface face, a visual display disposed on said surface face, and a plurality of buttons disposed on said surface face and manually movable for operation of said mobile inspection terminal means and comprising at least a power button to turn ON and OFF said mobile inspection terminal means and a checker button to start operation of said visual display;

means for recording temperature data and pass or failure data under control of said plurality of buttons; and means for controlling safety of food processing location using said temperature data and pass or failure data provided as test data by said mobile inspection terminal means.

2. The system of claim 1, further comprising a computer for editing said checklist; and wherein said edited checklist is inputted to said mobile inspection terminal means.

3. The system of claim 1, wherein said mobile inspection terminal means comprises:

temperature measuring means for measuring temperature of said object;

storage means for storing a checklist and test data;

item selection means for selecting check items from said check list in said storage means;

input means for providing instructions to said item selection means and for ordering said temperature measuring means to acquire temperature data and to receive pass or failure data; and data processing means for storing temperature data provided by said temperature measuring means and said pass or failure data provided by said input means, in said storage means as said test data, according to a check item selected by said item selection means.

4. The system of claim 3, wherein said mobile inspection terminal means comprises means for selecting check items lacking corresponding test data from said checklist and said test data.

5. The system of claim 1, wherein said checklist contains reference temperature; and wherein said mobile inspection terminal means comprises means for displaying said reference temperature and said check items.

6. The system of claim 1, wherein said mobile inspection terminal means comprises checker selection means for selecting checker data from said checklist; and means for handling said checker data selected by said checker selection means as a test data item.

7. The system of claim 6, further comprising a computer for editing said checklist; and wherein said edited checklist is inputted to said mobile inspection terminal.

8. The system of claim 1, wherein said mobile inspection terminal means comprises clock means for providing a date, time or both; and means for handling an output from said clock means as a test data item.

9. The system of claim 1, further comprising a computer into which said test data from said mobile inspection terminal means is inputted to create a table of test results.

10. A food safety administration system comprising:

mobile inspection terminal means for measuring temperature of an object under test and for receiving data on pass or failure of said object according to check items on a checklist, said mobile inspection terminal means being portable and band holdable and comprising a flat surface face, a visual display disposed on said surface face, and a plurality of buttons disposed on maid surface face and manually movable for operation of said mobile inspection terminal means and comprising at least one power button to turn ON and OFF said mobile inspection terminal means and a check button to start operation of said visual display;

means under control of said plurality of buttons for recording temperature data and pass or failure data and;

thereby controlling safety of food using said temperature data and pass or failure data provided as test data by said mobile inspection terminal means.

11. The system of claim 10, wherein said mobile inspection terminal means comprises:

temperature measuring means for measuring temperature of said object;

storage means for storing a checklist and test data;

item selection means for selecting check items from said checklist in said storage means;

input means for providing instructions to said item selection means and for ordering said temperature measuring means to acquire temperature data and to receive pass or failure data; and data processing means for storing temperature data provided by said temperature measuring means and said pass or failure data provided by said input means, in said storage means as said test data, according to a check item selected by said item selection means.

12. The system of claim 11, wherein said mobile inspection terminal means comprises means for selecting check items lacking corresponding test data from said checklist and said test data.

13. The system of claim 10, wherein said checklist contains reference temperature; and wherein said mobile inspection terminal means comprises means for displaying said reference temperature and said check items.

14. The system of claim 10, wherein said mobile inspection terminal means comprises checker selection means for selecting checker data from said checklist; and means for handling said checker data selected by said checker selecting means as a test data item.

15. The system of claim 14, further comprising a computer for editing said checklist; and wherein said edited checklist is inputted to said mobile inspection terminal.

16. The system of claim 10, wherein said mobile inspection terminal means comprises clock means for providing a data, time or both; and means for handling an output from said clock means as a test data item.

17. The system of claim 10, further comprising a computer into which said test data from said mobile inspection terminal means is inputted to create a table of test results.

18. The system of claim 10, further comprising means for editing said checklist; and wherein said edited checklist is inputted to said mobile inspection terminal means.

19. A food safety administration system comprising:

mobile inspection terminal means for displaying a check item and for measuring temperature of an object under test and for receiving data on pass or failure according to check items on a checklist;

means for recording temperature data and pass or failure data; and means for controlling hygiene or safety of food for a food shop using said temperature data and pass or failure data provided as test data by said mobile inspection terminal means.

20. The system of claim 19, wherein said mobile inspection terminal means comprises:

temperature measuring means for measuring temperature of said object;

storage means for storing a checklist and test data;

item selection means for selecting check items from said checklist in said storage means;

input means for providing instructions to said item selection means and for ordering said temperature measuring means to acquire temperature data and to receive pass or failure data; and data processing means for storing temperature data provided by said temperature measuring means and said pass or failure data provided by said input means, in said storage means as said test data, according to a check item selected by said item selection means.

21. The system of claim 20, wherein said input means contains one buttom for both ordering said temperature measuring means to acquire a temperature data and receiving pass data according to check items on said checklist.

22. The system of claim 19, wherein said checklist contains a recording method which shows the type of test data, temperature, pass or failure data; and wherein said mobile inspection terminal means comprises means for measuring the temperature of an object and for receiving data on pass or failure according to said recording method.

23. The system of claim 22, wherein said checklist contains a reference temperature; and wherein said mobile inspection terminal means comprises means for displaying said reference temperature and said check items in case of temperature depending on said recording method and for displaying said pass and failure data and said check items in case of pass or failure data depending on said recording method.

* * * * *